United States Patent
Mittelbach et al.

(10) Patent No.: US 8,590,153 B2
(45) Date of Patent: Nov. 26, 2013

(54) METHOD FOR PRODUCING AN ADSORPTION HEAT EXCHANGER

(75) Inventors: Walter Mittelbach, Haale an der Saale (DE); Willy Frank, Bad Lauchstädt (DE); Manfred Arnold, Leissling (DE)

(73) Assignee: Sortech AG, Halle (DE)

( * ) Notice: Subject to any disclaimer, the term of this patent is extended or adjusted under 35 U.S.C. 154(b) by 1284 days.

(21) Appl. No.: 11/908,525

(22) PCT Filed: Mar. 2, 2006

(86) PCT No.: PCT/EP2006/001883
§ 371 (c)(1),
(2), (4) Date: Jul. 14, 2008

(87) PCT Pub. No.: WO2006/097198
PCT Pub. Date: Sep. 21, 2006

(65) Prior Publication Data
US 2009/0217526 A1  Sep. 3, 2009

(30) Foreign Application Priority Data

Mar. 15, 2005 (DE) .......................... 10 2005 012 214
Dec. 7, 2005 (DE) .......................... 10 2005 058 624

(51) Int. Cl.
*B21D 53/02* (2006.01)

(52) U.S. Cl.
USPC .................... 29/890.03; 165/104.12; 165/133

(58) Field of Classification Search
USPC ........................ 29/890.03, 890.035–890.054; 165/104.12, 133, 166, 909
See application file for complete search history.

(56) References Cited

U.S. PATENT DOCUMENTS

| 3,713,281 | A | | 1/1973 | Asker et al. |
|---|---|---|---|---|
| 4,503,907 | A | * | 3/1985 | Tanaka et al. ................. 165/133 |
| 5,485,675 | A | * | 1/1996 | Jones et al. ............. 29/890.046 |
| 5,585,145 | A | * | 12/1996 | Maier-Laxhuber et al. .. 427/380 |
| 5,731,260 | A | * | 3/1998 | Abell ............................ 502/416 |
| 6,102,107 | A | | 8/2000 | Dunne |
| 6,649,305 | B1 | | 11/2003 | Bugnet et al. |
| 6,813,901 | B2 | * | 11/2004 | Mabuchi et al. ................ 62/476 |
| 7,165,418 | B2 | * | 1/2007 | Mabuchi et al. ................ 62/476 |
| 7,981,199 | B2 | * | 7/2011 | Burk et al. ....................... 96/154 |
| 2005/0005769 | A1 | | 1/2005 | Seguin et al. |

FOREIGN PATENT DOCUMENTS

| DE | 41 29 700 A1 | 4/1992 |
|---|---|---|
| DE | 41 29 700 C2 | 4/1992 |
| DE | 197 30 697 | 1/1999 |
| DE | 199 09 030 | 9/2000 |
| DE | 101 41 524 | 3/2003 |

(Continued)

OTHER PUBLICATIONS

English language abstract translation.

(Continued)

*Primary Examiner* — Richard Chang
(74) *Attorney, Agent, or Firm* — Faegre Baker Daniels LLP

(57) ABSTRACT

The invention relates to a method for producing an adsorption heat exchanger, which is characterized by the following Steps: producing a heat exchanger structure; forming an adhesive layer (5) on the heat exchanger structure; filling the heat exchanger structure with a sorbent material (6.1); removing from the heat exchanger structure portions of the sorbent material that have bonded only weakly or not at all to the adhesive structure.

22 Claims, 3 Drawing Sheets

(56) References Cited

FOREIGN PATENT DOCUMENTS

| | | |
|---|---|---|
| DE | 101 41 525 | 3/2003 |
| JP | 8-271085 | 10/1996 |
| JP | 08-271085 | 10/1996 |
| JP | 8-271085 A | 10/1996 |
| JP | 09-189459 | 7/1997 |
| JP | 11-166772 | 6/1999 |
| JP | 11-287531 | 10/1999 |
| JP | 11-300147 | 11/1999 |
| JP | 11-304383 | 11/1999 |
| JP | 2000-18767 | 1/2000 |

OTHER PUBLICATIONS

English language translation of Japanese Office Action at least as early as Aug. 11, 2010.

English language translation of Japanese Office Action at least as early as Feb. 18, 2013.

\* cited by examiner

METHOD FOR PRODUCING AN ADSORPTION HEAT EXCHANGER

CROSS-REFERENCE TO RELATED APPLICATION

This application is related to and claims the benefit under 35 U.S.C. §119 and 35 U.S.C. §365 of International Application No. PCT/EP2006/001883, filed Mar. 2, 2006.

The present invention relates to a method for producing an adsorption heat exchanger, especially an adsorption heat exchanger comprising a heat exchanger structure which is filled with a presynthesized sorbent solids material.

Adsorption heat exchangers comprise a heat exchanger structure which is used for supplying and discharging thermal energy and which are in a thermal contact with a sorbent material which uses a phase change of a working medium, which is a so-called sorptive, for binding and releasing latent heat. Heat is released through the condensation of a vaporous working medium. Conversely, the thermal energy supplied via the heat exchanger structure can be used for the renewed vaporization of the sorptive. Solids materials are mostly used for performing the phase change of the sorptive, which are so-called sorbent materials. Characteristic for such sorbent materials are their open-pore structure with a high ratio of surface to volume. Typical surface dimensions of sorbent materials can reach a few 100 $m^2/g$ of sorbent material. The inner cavities in these materials have molecular magnitude dimensions. The effect of the sorbent materials is based on absorbing foreign atoms and foreign molecules in their micro-porous structure and thus to transfer from the gas phase to a bonded state. Examples for sorbent materials used in adsorption heat exchangers are clays such as bentonite, silica gel or zeolites. Water is usually used for these sorbent materials as a working medium, which has a high heat of condensation of 2000 kJ/kg and moreover represents a working medium that is easy to use.

Strictly speaking, the working medium which is subject to a phase change is designated with two special terms. The absorbing, but not yet sorbed working medium is called sorptive, whereas the adsorbed or inserted working medium is called sorbate. In order to reduce the large number of different terms in this description, the working medium shall be called sorptive irrespective of its phase state, which also means the state in which it is sorbed in the sorbent material (which is also known as sorbent or sorption agent).

Typical applications of adsorption heat exchangers are latent heat exchangers and adsorption heat pumps. The former is used for storing thermal energy and the latter uses sorbent materials in heat pump technology.

When an adsorption heat exchanger is supplied with thermal energy from the outside, e.g. by having a heat carrier liquid flow through the same, the heat flowing in from the outside needs to be transferred effectively to the sorbent material in order to release the adsorbed working medium situated in the same. In the opposite case, the release of thermal energy, which means an energy flow direction out of the adsorption heat exchanger, the thermal energy released as a result of the condensation of the working medium on the sorbent material needs to be transported from the adsorption heat exchanger to the outside. Since known sorbent materials show adverse thermal conductivity, adsorption heat exchangers are usually produced as a combination of a heat exchanger structure with high thermal conductivity and the sorbent material that is used for binding and releasing the working medium. The heat exchanger structures mostly consist of metallic materials such as copper, aluminum or stainless steel, as well as other materials with a high thermal conductivity such as ceramic materials and certain plastic materials.

Heat exchangers comprise cavities for allowing direct flow with a heat carrier medium which usually does not come into direct contact with the sorbent material. The heat exchanger structure comes into thermal contact with the sorbent material. In the simplest of cases this occurs in the form of bulk material, with the sorbent material being mostly present in the form of powder or by mixture with a binder in the form of pellets. Such a structure which is easy to realize comes with a number of disadvantages. There is mostly an adverse heat transmission between the sorbent material and the walls of the heat exchanger structure. It is even worse for such areas of the sorbent material which are not in direct bearing contact with the heat exchanger structure.

A further problem is to supply the sorptive in vapor form to the sorbent material as well as possible. This requires however that in addition to the microporous structure in the sorbent material there are continuous channel structures for the convective transport of the vaporous working medium. When sorbent material is introduced in the simplest case in the form of bulk material into a prefabricated heat exchanger structure as explained above, notice must be taken that such a channel system in the sorbent material is maintained for the sorptive. This requires that the sorbent material is not strongly compacted. In order to solve this problem, a sorbent material in granular form or in the form of pellets is introduced instead of a powdery sorbent material. This comes with the disadvantage however that as a result of the mostly point-like contact between the individual grains of the sorbent material the heat conduction from and to the heat exchanger structure is degraded.

There is thus a goal conflict for the construction of efficient adsorption heat exchangers. On the one hand it is necessary to have the best possible thermal contact between the sorbent material and the heat exchanger structure. On the other hand it is necessary to maintain the open-pore structure of the sorbent material and in addition it is necessary to form in the sorbent material a system of macroscopic channels for the transport of the gaseous sorptive. Adsorption heat exchangers have become known for solving this problem in which at least parts of the heat exchanger structure are formed from thin metal plates or metal foils which are provided in advance with a coating made of sorbent material. JP 11300147A discloses the production of the coated foil, on the surface of which sorbent particles are embedded at least partly in a layer of adhesive. In addition, said sorbent particles are covered with a film applied in a planar manner. For arranging the structure of an adsorption heat exchanger, the foils thus coated are folded in the form of a honeycomb-like structure.

A method for producing adsorption heat exchanger elements has become known from DE 41 29 700 C2. A heat exchanger element is made up of a plurality of flat plates, with each of said plates carrying a coating with an adhesive layer and inorganic adsorption particles embedded therein. In order to complete the heat exchanger element, a part of said plates is provided with a wavy structure and a stacked system of a sequence of wavy and plane plates is formed. The starting point for producing the flat plates are aluminum foils with a material thickness of 30 pm, onto which an adhesive layer with a thickness of 10 to 30 pm is applied by brushing on by means of rollers. An adhesive from the polyvinyl acetate group is used for this purpose. This adhesive is partly dried at first, so that the adhesive layer is still viscous, but has not yet set. Synthetic zeolite particles with a diameter<100 pm are blown onto the adhesive layer, with the zeolite particles being embedded substantially completely in the adhesive layer, thus providing a loading with zeolite of 12 g/m². In a further method step there is a brief heating within approximately 10 sec to a temperature of 100 to 250° C. As a result of this rapid heating process, the gases bound in the bores of the zeolite particles are released, thus forming channels for the later gas exchange between the embedded zeolite particles and the surface of the coating. For improving the channel formation it is proposed to introduce additional expanding agents in the adhesive. Then the adhesive layer sets and dries in a dry heating apparatus.

The arrangement of adsorption heat exchangers of foils already coated with sorbent material comes with the advantage that a careful arrangement of the contact zone between the wall of the heat exchanger structure and the sorbent material is enabled. Furthermore, a suitable channel system for the vaporous sorptive can be provided by a respective three-dimensional configuration of the foil structures. The disadvantageous aspect in such a procedure is however that in addition to the additional work steps for the coating, the further processing of the foils after the application of the coating is cumbersome. The foils need to be treated carefully because of the applied sorbent materials. Moreover, the mostly thin foils are limited with respect to their static stability. Both factors encumber the free design in arranging the heat exchanger structure. It further needs to be considered that the known foil coatings are limited with respect to their loading with sorbent materials. Higher loading densities require larger sorbent particles, which can be used with the known foil coating methods only within limits however.

A production method for adsorption heat exchangers has become known from JP 2000018767A, in which at first a heat exchanger structure is formed which is then filled with sorbent material and an adhesive. In order to avoid the problems as explained above, a filling made of sorbent material and a thermoplastic adhesive is introduced into the heat exchanger structure. Both the sorbent material as well as the adhesive are present in granular form, with the grain sizes of the sorbent material and that of the adhesive being adjusted to each other. In a subsequent heating step the adhesive will melt down and will join the individual sorbent granulate grains with each other in a point-like manner. When the grain size of the thermoplastic adhesive is chosen sufficiently small, there will be cavities between the individual sorbent granulate grains even after the melting step, which cavities are provided for the transport of the gaseous sorptive. This procedure represents an improvement to loose bulk material both with respect to thermal conductivity between the sorbent grains as well as with respect to the mechanical solidification of the sorbent material. There is still the problem in such a system that no suitable channel system is obtained for a sufficient transport of the gaseous sorptive. In addition there are areas in the sorbent material which as a result of the loose introduction of the bulk material have a certain distance to the wall of the heat exchanger structure and therefore can contribute only in a considerably more adverse manner to the heat transfer from and to the heat exchanger structure.

The invention is based on the object of providing a method for producing an adsorption heat exchanger which is based at first on a freely and separately arranged heat exchanger structure which is subsequently brought in connection with a sorbent material. The combination system of heat exchanger structure and sorbent material should have a high thermal conductivity between the walls of the heat exchanger structure and the sorbent material and additionally enable the most efficient transport of the gaseous sorptive to the microporous structure of the sorbent material. The method for producing the adsorption heat exchanger should further be characterized by a simple realization and enable the production of adsorption heat exchangers with a high adsorption/desorption capability for the sorptive.

These objects are achieved by the independent claims. Advantageous embodiments are provided by the sub-claims.

In order to realize the object, the inventors have recognized at first that the sorbent material in granulate form with a sufficient grain size needs to be glued to the inside surfaces of a heat exchanger structure in such a way that the individual granulate grains of the sorbent material are embedded only partly in said adhesive layer, which means that a substantial part of its surface can still interact with the gas phase of the sorptive and at the same time each of said granulate grains is in a sufficient thermal contact with the walls of the heat exchanger structure. In an advantageous embodiment there should not be any granulate grains of the sorbent material without such an adhesive connection with the walls of the heat exchanger structure. A system of macroscopic channels is thus produced in this way in the adsorption heat exchanger which can be used for an efficient transport of the gaseous sorptive.

The starting point for the production of an adsorption heat exchanger in accordance with the invention is at first a base heat exchanger structure which is produced separately. It is produced according to the known method from materials of high thermal conductivity. Suitable for this purpose have proven to be metallic systems such as ones made of copper, aluminum or special steel. Ceramic materials or combined material systems are also possible. Suitable heat exchanger structures realize a circulation system for a heat carrier medium which is in connection with the outside area of the adsorption heat exchanger. In addition, heating wires or other heat sources can be embedded for heating the heat exchanger structures. In order to produce the largest possible surface towards the sorbent material system, a lamella-like or honeycomb-like structure is preferred. It can also be in the form of a sponge or foam. Based on this heat exchanger structure which is produced separately at first, an inside coating with sorbent material is now carried out as follows:

In a first method step, an adhesive layer is applied to the wall of the heat exchanger facing towards the sorbent material, which hereinafter shall be referred to as inside wall. An adhesive is used for this purpose which forms a solid layer at first. For realizing said adhesive layers it is possible to use different methods such as immersion, flooding or spraying. The method steps of adhesive coating can further be repeated for setting an optimal layer thickness. It is especially advantageous in this respect to set the viscosity of the applied adhesive by tempering or by enriching or evaporation with solvents for example. It is alternatively also possible to apply the adhesive in a solid powdery state to the walls of the heat exchanger. Such powder coating is especially useful in planar heat exchanger structures. The heat exchanger can further be filled at first with powdery adhesive which is then activated by heating of the heat exchanger structure in regions of the heat exchanger close to the wall, so that there is bonding in the area close to the walls and the subsequent removal of the non-adhering powdery adhesive material from the areas remote of the walls is possible by shaking, blowing or rinsing. Irrespective of the choice of adhesive or the chosen application method, the adhesive layer in the region close to the wall must adhere at least in such a stable manner that during the subsequent method step in which the sorbent material is introduced into the heat exchanger there is no functionally impairing mixture of the adhesive of the sorbent material.

Suitable adhesives are characterized in that they melt down above a first temperature and solidify above a second temperature which is higher than the first temperature. Epoxy resin in particular has proven to be a suitable adhesive. An adhesive based on epoxy resin melts above a first temperature, which typically lies at 50 to 70° C. Above a second temperature which lies in the range of 100 to 200° C. there will be setting, with cross-linking occurring in the epoxy resin and the same sets into a thermosetting resin with high temperature stability and a respectively high glass transition temperature.

In the first method step for forming the solid adhesive layer on the inside wall, a solvent such as acetone, methyl ethyl ketone, methylene chloride is used in the case of an adhesive based on epoxy resin in order to liquefy the adhesive at first. The heat exchanger structure is immersed into the epoxy resin solution for applying said liquefied adhesive. The excess adhesive is then removed still in the liquid state from the heat exchanger structure and the adhesive layer dries at first into a solid adhesive layer, which means a layer that is substantially no longer adhesive. For setting the layer thickness of the adhesive layer, the viscosity of the adhesive can be adjusted by setting the solvent proportion or the temperature for example. It is further also possible to apply several layers of adhesive by repeating the above work steps.

Moreover, further application methods for the adhesive layer may be spraying or brushing the heat exchanger structure with adhesive. Furthermore, a reduction of the viscosity up to the liquid state can be achieved instead of liquefying with solvent by an adjustment of the temperature of the adhesive and/or the heat exchanger structure. The adhesive layer solidifies after the application of the adhesive. This is produced by a lowering of the temperature or by a sufficient service life up to the volatilization of the solvent.

When a heat exchanger structure thus prepared is filled with granular sorbent material, no adhesive connection between the introduced sorbent particles and the adhesive layer covering the inside wall of the heat exchanger structure is produced without any additional heat treatment. This has the advantage that the adhesive connection can be produced in this manner in a controlled way and it is realized only for such sorbent particles which are situated in direct contact with the inside wall of the heat exchanger structure. Heat is supplied to the adhesive layer for this purpose. This may occur by the introduction of the heat exchanger structure into a warming cabinet and/or furnace or by irradiation with infrared radiation. This heat or energy input can also be called energy input from the outside. For example, inductive heating of the heat exchanger structure may be considered. Heating from the inside by supplying a heat carrier medium of a respective temperature to the heat exchanger structure is also possible. Heated sorbent material can be supplied in a further embodiment.

In this case, the heating is controlled with respect to duration and chosen temperature progress in such a way that based on the mean adhesive thickness and the chosen grain size of the granular sorbent material the sorbent particles adjacent to the walls of the heat exchanger structure are wetted with the molten adhesive in their contact area, but simultaneously protrude with substantial parts of their surface from the adhesive layer. The particles therefore penetrate the adhesive layer, but are not completely enclosed by the same, so that the same are able to enter into exchange with the sorptive, which means the same are accessible for adsorption and desorption of the sorptive and thus for the turnover of latent heat.

The temperature in the heat exchanger structure is then increased over the second temperature at which the setting of the adhesive layer occurs. In the case of an epoxy resin adhesive, a final cross-linkage and the conversion into a thermosetting resin occurs. After the completion of this cross-linkage and setting process above the second temperature, a stable adhesive connection which is especially temperature-stable is obtained for the granular sorbent particles which are directly adjacent to the walls of the heat exchanger structure, without impairing their interaction capability with the atmosphere in the interior of the adsorption heat exchanger, which means for an effective exchange with the sorptive.

In a preferred further method step the sorbent particles not glued to the wall area are removed from the heat exchanger structure. This can occur by means of mechanical measures such as vibrating for example or by the application of a negative pressure. This measure leads to macroscopic cavities and channels through which the gaseous sorptive can flow. This ensures a sufficient transport of sorptive in gas form to the sorbent particles glued to the walls of the heat exchanger structure. They on the other hand are in sufficiently favorable thermal contact with the heat exchanger structure, so that the latent heat released or bound by the phase change of the sorptive can also effectively flow in or out via the heat exchanger structure.

In an alternative embodiment of the method in accordance with the invention, the layer of adhesive which is used for producing a connection and is applied to the region close to the wall is not activated. Instead, the desired local distribution of the adhesive in the region close to the wall is already ensured by the method step of applying the adhesive on the heat exchanger. This can occur for example by filling the heat exchanger structure with a powdery adhesive which is provided with its adhesive force in the region close to the walls by heating of the heat exchanger structure, with the adhesive remaining substantially non-adhesive and powdery in the area remote from the walls. The non-adhesive proportion can then be removed from the heat exchanger. This is best achieved by supporting mechanical measures such as shaking, blowing or rinsing. The planar adhesive layer in the region close to the walls retains its adhesive property, i.e. an activation after the sorbent material has been introduced is not necessary for this embodiment.

The production method in accordance with the invention for adsorption heat exchangers will be described below in closer detail by reference to the drawings, wherein.

Figure 2:
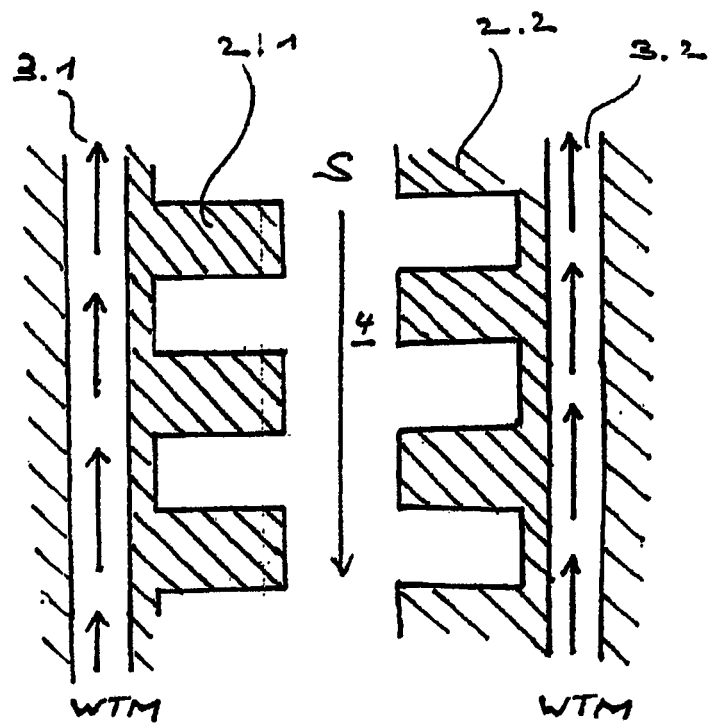
FIG. 2 shows a heat exchanger structure.
Figure 3:
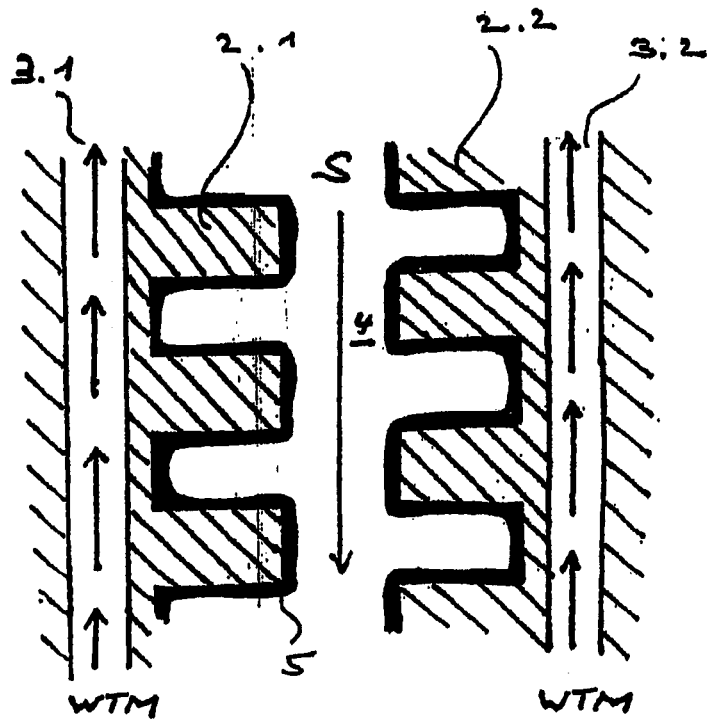
FIG. 3 shows the heat exchanger structure of FIG. 2 after the application of a rigid adhesive layer.

FIG. 2 shows a schematic simplified view of a base heat exchanger structure with ribs 2.1, 2.2 which consist of a material of high thermal conductivity. A metal such as copper, aluminum or special steel is usually used for this purpose. The heat exchanger structure further preferably comprises cavities 3.1, 3.2 for flowing through with a heat carrier medium (WTM). They are typically in connection with the outside area not shown in closer detail in FIG. 2. Heat is supplied to or removed from the later adsorption heat exchanger via the heat carrier medium (WTM) circulating in said cavities 3.1, 3.2. Such a heat exchanger structure is typically associated with a vessel which is tight for the gas phase of the sorptive and thus encloses a working chamber which is designated in the present application as inside area 4 and is used for receiving the sorbent material and the sorptive S. The manner of sealing said inside area against the outside area depends on the use of the adsorption heat exchanger. It is therefore also possible that the same is introduced into a system which allows the passage of the sorptive from a first area in which the adsorption heat exchanger is located to a second area.

In the present embodiment the heat exchanger structure comprises lamella-like cooling ribs in the inside area 4, which ribs have a distance between lamellae of 4 mm. This and further heat exchanger structures were filled with sorbent material of different particle size. For further trials, heat exchanger structures with lamellae distances of 1.6 mm, 2.3 mm, 4 mm and 5 mm were used, with the particle sizes of the granular sorbent material being varied and being adjusted to the respective distances between the lamellae. The distances between the lamellae of the heat exchanger structures were adjusted to the respective particle size, starting with a minimum distance of 4 mm. Materials for the lamellae were copper and aluminum. Preferably, they concern structured lamellae, which means that they are wavy or serrated in order to provide the highest possible ratio of surface to volume.

Based on a separately produced heat exchanger structure according to FIG. 2, it is lined according to a first method step with an adhesive layer wetting the inside wall for inside coating, which layer forms a solid layer prior to filling with the sorbent material. Such a solid adhesive layer shall be understood in accordance with the present application as having a substantial loss of adhesive power, which is usually achieved by a sufficiently long drying or a suitable temperature setting of the adhesive layer. According to a first embodiment, an epoxy resin adhesive is used as an adhesive which was mixed with a solvent such as acetone for applying an adhesive layer on the inside wall of the heat exchanger structure. Said epoxy resin solvent mixture is introduced into the inside area 4 of the heat exchanger structure, whereupon excessive adhesive is removed by dripping from the inside area, so that preferably a substantially continuous adhesive layer rests on the inside wall of the heat exchanger structure without blocking the lamellae structure. This means that preferably an adhesive layer will follow the contour of the inside wall without substantially reducing the surface area of the inside wall of the heat exchanger structure. In the event of an epoxy resin adhesive with proportions of solvent an evaporation of the solvent and thus a solidification of the adhesive layer will occur after a sufficient dwell time, so that after the completion of this method step a solid adhesive layer 5 covers the inside wall. In the present embodiment, said solidification and drying step is accelerated by a temperature treatment at 50° C. This subsequent drying is performed for a period of approximately three hours.

The layer thickness of the adhesive layer is adjusted to the size distribution of the sorbent particles. If sorbent particles are used in a size range of 10 to 1000 pm and preferably 20 to 50 pm, the thickness of the adhesive layer will be adjusted in such a way that during the production of an adhesive connection with the sorbent particles the latter will be wetted only partly. In a preferred embodiment, the layer thickness is set at a range of one third to two thirds of the particle diameter and especially the mean particle diameter. In an especially preferred embodiment, the application thickness of the adhesive layer corresponds on average to half the particle size of the sorbent particles, which means in the case of substantially round sorbent particles their radius is assumed substantially for the layer thickness of the adhesive. In the case of spherical sorbent particles with a size distribution of 100 to 200 pm, a mean layer thickness for the adhesive layer of 50 pm will be applied.

Figure 4:
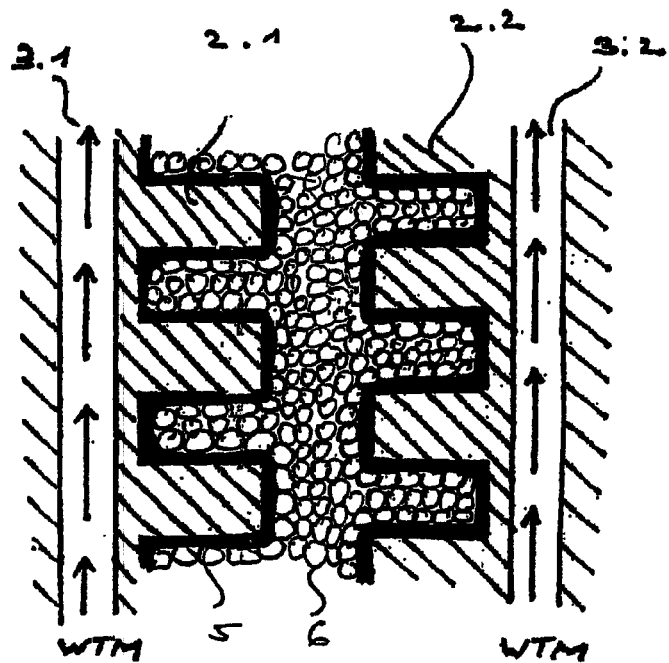
FIG. 4 shows the heat exchanger structure of FIG. 3 which is filled with granular sorbent material.

FIG. 4 shows a further method step, which is the filling with adsorbent material in granular form. Synthetically produced zeolite or silica gel can be used as adsorbent material. Active carbon can also be considered as adsorbent material. According to a first embodiment, a granularity of the sorbent material of 0.8 to 1.0 mm is used. In further embodiments, sorbent particles with a size distribution of 100 to 200 pm and of 1 to 2 mm were used for adsorption heat exchangers in accordance with the invention. A sufficient filling of even the small cavities in the heat exchanger structure can advantageously be ensured by mechanical measures such as shaking or a certain pressing pressure. In the event that the heat exchanger structure is arranged in such a way that the inside area 4 is not completely enclosed by a vessel-like structure prior to the introduction of the sorbent material, such a heat exchanger structure can be enclosed by a custom-fit form lined with siliconized paper. Such a heat exchanger structure which is at least partly open in the coating area can be introduced in a subsequent method step into a suitable vessel which is used for sealing a work area containing the sorbent material and the sorptive.

Immediately after the introduction of the sorbent material in the form of a loose bulk material, there is substantially no adhesive contact between the solid adhesive layer 5 and the sorbent material 6. This is only achieved by a further heat treatment step, with a precise check in the arrangement of the adhesive connection between the originally rigid adhesive layer and the directly adjacent sorbent particles 6.1 is enabled by the choice of the temperature profile. In order to carry out this method step, the adhesive 5 which is applied in the form of a solid layer must further have the property that it liquefies above a first temperature T1 and solidifies above a second temperature T2 which is higher than the first temperature T1. This required property can be realized by an epoxy resin adhesive. In the present embodiment, the first temperature T1 at which the adhesive melts will usually be for an epoxy resin in a range of 60 to 66° C. The second temperature threshold which leads to the final solidification of the adhesive layer is a temperature of 120 to 140° C. for an epoxy resin, whereby 120° is especially sufficient. By driving a temperature ramp from one temperature beneath the first temperature to a temperature above the second temperature, there will at first be the melting of the originally solid adhesive layer 5. As a result, the adhesive will wet the directly adjacent sorbent particles 6.1, which preferably occurs in such a way that they still protrude with most of their surface portion out of the adhesive layer. In the course of the further rise of temperature the second temperature will be exceeded. Cross-linking occurs then in the case of an epoxy resin adhesive and a temperature-stable thermosetting composition is obtained. According to the embodiment as shown here, the heating up to the melting of the adhesive layer, the gluing of the sorbent particles adjacent to the wall and the final setting is achieved by heating the heat exchanger structure by feeding heat carrier fluid with a temperature of 180° C. over a period of 30 minutes.

Figure 1:
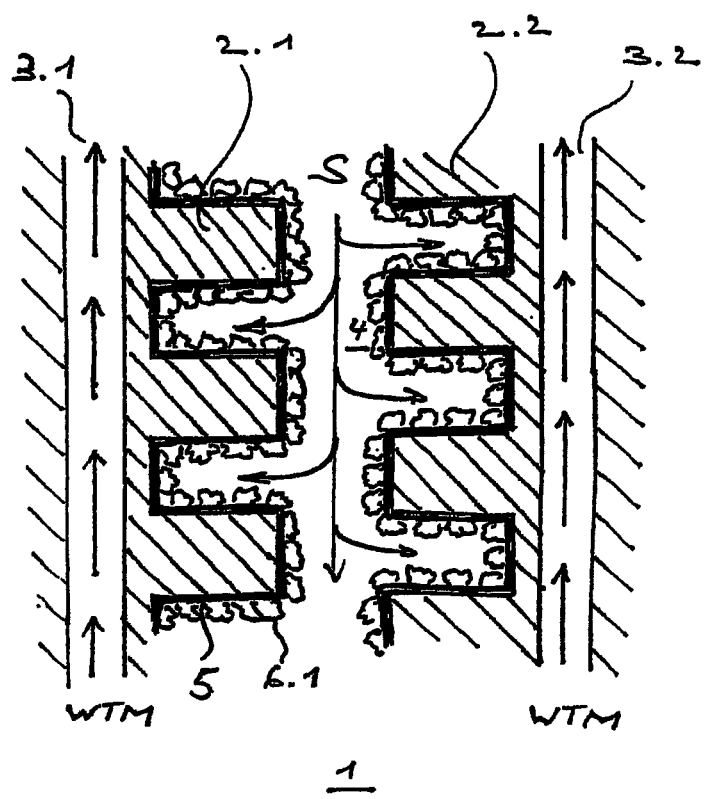
FIG. 1 shows a partial sectional view of an adsorption heat exchanger which is produced with the method in accordance with the invention and comprises a heat exchanger structure with granular sorbent material which adheres in an adhesive manner.
Figure 5:
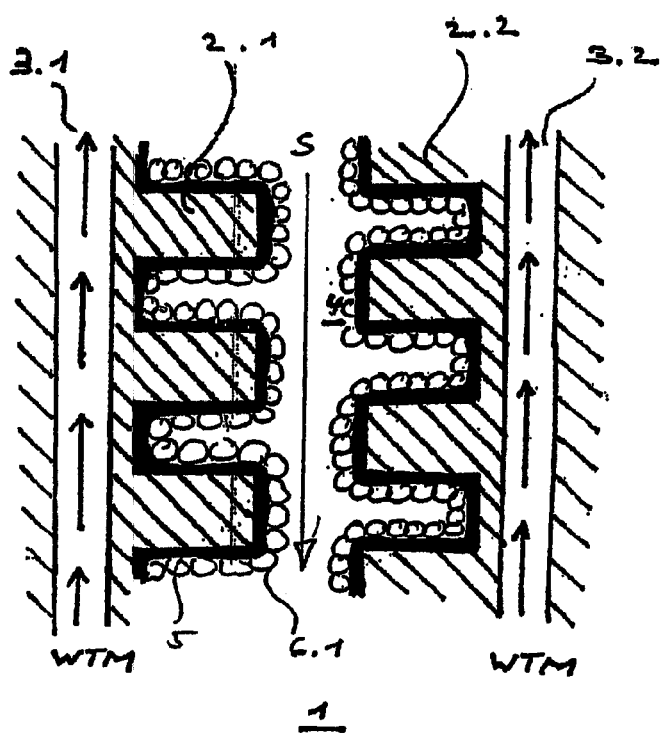
FIG. 5 shows the heat exchanger of FIG. 4 after performing the heating step for melting down and setting of the adhesive layer and after the removal of the nonadhesive sorbent particles.

The non-adhering sorbent particles, which means those remote from the wall, will be removed in a further method step from the inside area 4. This can be supported by suitable mechanical measures such as shaking for example. A heat exchanger structure is thus obtained which has an inside coating made of sorbent material, as is schematically shown in FIG. 5. The sorbent particles merely line the inside wall and are glued to said inside wall, with the gluing only being made in a pointlike manner, which means that the sorbent particles protrude with essential parts from the adhesive layer and are capable of entering into interaction with a supplied sorptive with their substantially still intact untreated surface. Apart from the direct wall region, there are no glued sorbent particles in the inside area 4 according to a preferred embodiment. This enables the sorptive to flow towards the sorbent particles in an unhindered manner, which means that sufficiently large areas in the inside area 4 remain free for the convective transport of the vaporous sorptive. This unhindered inflow of the sorptive S to the sorbent particles 6.1 on the inside walls, which as a result of the adhesive connection have a favorable thermal contact, is shown again in FIG. 1 schematically. The further reference numerals correspond to those of FIGS. 2 to 5.

A further advantage of the arrangement of a firstly rigid adhesive layer on the inside walls of the heat exchanger structure is that by forming a closed layer there is also a protection against corrosion for the metallic parts of the heat exchanger structure. Such a protection for the heat exchanger material is not provided to loose bulk materials of the sorbent material according to the state of the art and only for sorbent particles which are glued among each other in a point-like manner. In addition to the substantially complete coverage of the inside walls of the heat exchanger structure, it is further necessary for sufficient protection from corrosion that the adhesive layer is substantially closed, which means that it is not porous. This is provided by the formation of a firstly solid and then molten and solidifying adhesive layer, which melting occurs through the thermal treatment.

Further embodiments of the invention are possible. The type of sorbent material can be varied for example. Zeolites are used according to an advantageous embodiment of the invention which have a granulation of 0.2 to 0.3 mm for coating a latent heat exchanger with a distance between lamellae of 2 mm. An adjustment of the grain size of the sorbent material to the geometrical arrangement of the heat exchanger structure is thus preferred. For a respectively adjusted heat exchanger structure, sorbent materials of a smaller grain size such as 100 to 200 pm and such with a large grain size of approximately 1 to 2 mm are advantageous. A homogeneous grain size distribution is especially preferred because this leads to an even layer of sorbent material which adheres in an adhesive manner to the inside wall of the heat exchanger structure. According to a further development, different grain sizes for the sorbent material can be mixed. Bimodal grain size distributions can be used for example, which is especially advantageous when using large granulations. The method in accordance with the invention can be used to glue larger sorbent particles with a diameter of 1 to 2 mm and more to the inside walls of the heat exchanger structure, thus enabling coatings with 60 to 500 g of sorbent material per square meter. Such large sorbent particles protrude to a sufficiently high extent from the adhesive layer, and thus offer the sorptive a large surface which is not covered in a diffusion-tight manner. By using additional small sorbent particles it is possible to cover occurring cavities between said large sorbent particles on the inside walls of the heat exchanger structure, which thus further increases the loading density of the sorbent material.

The method in accordance with the invention can be used to employ irregularly formed sorbent particles for coating heat exchanger structures. It is thus also possible to use sorbent material in the form of fragments of random grain size and with a widely ranging particle size distribution. This also includes the use of dustlike portions and larger fragments and a respective mixture thereof. It is thus possible that the smaller and also the larger particles are wetted only partly by the adhesive layer, which is achieved especially by a melting merely close to the surface or by rapid travel through the molten range up to the range of the solidification of the adhesive. Furthermore, the wetting properties of the adhesive can be adjusted to the chosen sorbent material, so that although gluing of the sorbent particles to the walls of the heat exchanger structure is achieved, wide parts of their surfaces can perform an unhindered exchange with the sorptive.

The invention claimed is:

1. The method for producing an adsorption heat exchanger, comprising the following steps:
    producing a base heat exchanger structure;
    forming an adhesive layer on the base heat exchanger structure, with an adhesive being used for the adhesive layer which melts down above a first temperature and solidifies above a second temperature which is higher than the first temperature;
    introducing a sorbent material into the base heat exchanger structure, with the adhesive layer being solid prior to the introduction;
    bringing the adhesive layer to a temperature above the first temperature after the introduction of the sorbent material into the base heat exchanger structure, with the adhesive layer melting down and forming an adhesive connection with the sorbent material directly adjacent to the adhesive layer;
    heating the adhesive layer to a temperature above the second temperature for solidification; and
    removing weakly adhesive or non-adhesive portions of the sorbent material from the base heat exchanger structure.

2. The method for producing an adsorption heat exchanger according to claim 1, wherein the sorbent material is present in granular form during the introduction into the base heat exchanger structure.

3. The method for producing an adsorption heat exchanger according claim 2, wherein the adhesive for producing the adhesive layer on the heat exchanger structure is liquid in an original state or is liquefied by mixture with a solvent or follows in form of a powder.

4. The method for producing an adsorption heat exchanger according to claim 2, wherein, an epoxy resin adhesive is used as the adhesive.

5. The method for producing an adsorption heat exchanger according to claim 2, wherein the solid adhesive layer is produced by introduction of a liquid mixture of adhesive and solvent into the base heat exchanger structure and/or at a temperature above said first temperature and below said second temperature.

6. The method for producing an adsorption heat exchanger according to claim 2, wherein the sorbent material comprises one or more of silica gel, zeolite, clay or active carbon.

7. The method for producing an adsorption heat exchanger according to claim 1, wherein the adhesive for producing the adhesive layer on the base heat exchanger structure is liquid in an original state or is liquefied by mixture with a solvent or the adhesive for producing the adhesive layer is applied in a solid powdery state to the base heat exchanger structure.

8. The method for producing an adsorption heat exchanger according to claim 7, wherein an epoxy resin adhesive is used as the adhesive.

9. The method for producing an adsorption heat exchanger according to claim 7, wherein the solid adhesive layer is produced by introduction of a liquid mixture of adhesive and solvent into the base heat exchanger structure and/or at a temperature above said first temperature and below said second temperature.

10. The method for producing an adsorption heat exchanger according to claim 7, wherein the sorbent material comprises one or more of silica gel, zeolite, clay or active carbon.

11. The method for producing an adsorption heat exchanger according claim 1, wherein an epoxy resin adhesive is used as the adhesive.

12. The method for producing an adsorption heat exchanger according to claim 11, wherein the solid adhesive layer is produced by introduction of a liquid mixture of adhesive and solvent into the base heat exchanger structure and/or at a temperature above said first temperature and below said second temperature.

13. The method for producing an adsorption heat exchanger according to claim 1, wherein the solid adhesive layer is produced by the introduction of a liquid mixture of adhesive and solvent into the base heat exchanger structure and/or at a temperature at which the adhesive is molten.

14. The method for producing an adsorption heat exchanger according to claim 1, wherein the sorbent material comprises one or more of silica gel, zeolite, clay or active carbon.

15. The method for producing an adsorption heat exchanger according to claim 1, wherein the sorbent material has a grain size of ≥0.1 mm.

16. The method for producing an adsorption heat exchanger according to claim 1, wherein an adhesive cross-linking solidifies above the second temperature.

17. The method for producing an adsorption heat exchanger according to claim 1, wherein the solid adhesive layer is formed in such a way that substantially an entire inside surface of the heat exchanger structure is covered with a closed layer.

18. The method for producing an adsorption heat exchanger according to claim 1, wherein heating of the base heat exchanger structure to a temperature above the first temperature and/or a temperature above the second temperature is produced by supply of a heated heat carrier medium to the base heat exchanger structure and/or by energy input from the outside.

19. The method for producing an adsorption heat exchanger according to claim 18, wherein the heating of the base heat exchanger structure is produced by radiation energy input.

20. The method for producing an adsorption heat exchanger according to claim 19, wherein the radiation energy input is one of a furnace and/or by inductive heating.

21. The method for producing an adsorption heat exchanger according to claim 1, wherein the sorbent material is heated prior to introduction of the sorbent material into the base heat exchanger structure.

22. The method for producing an adsorption heat exchanger according to claim 1, wherein the sorbent material has a grain size of ≥0.2 mm.

* * * * *